United States Patent [19]

Furuya

[11] 4,074,198
[45] Feb. 14, 1978

[54] SYSTEM FOR SUPPRESSING SIDEBAND COMPONENTS OF ANGLE-MODULATED WAVE

[75] Inventor: Tadashi Furuya, Tokyo, Japan

[73] Assignee: Nippon Electric Company, Ltd., Tokyo, Japan

[21] Appl. No.: 686,202

[22] Filed: May 13, 1976

[30] Foreign Application Priority Data

May 16, 1975 Japan ................................ 50-58045

[51] Int. Cl.² .............................................. H04B 1/60
[52] U.S. Cl. ........................................ 325/3; 325/10; 325/138
[58] Field of Search ........................ 325/3, 5, 7, 9–11, 325/137, 49, 138; 179/15 FE, 15 FS, 15 BD; 332/44, 45

[56] References Cited

U.S. PATENT DOCUMENTS 3,132,339  5/1964  Boughnou ........................... 325/137
3,294,914  12/1966  Muller ..................................... 325/3

*Primary Examiner*—Robert L. Griffin
*Assistant Examiner*—Jin F. Ng
*Attorney, Agent, or Firm*—Sughrue, Rothwell, Mion, Zinn and Macpeak

[57] ABSTRACT

A system for suppressing a predetermined part of the sideband components of an angle-modulated wave in a frequency-division multiplex system is disclosed. The system branches the received angle-modulated wave into two angle-modulated waves, one of which is applied as the signal input of a phase modulator. The other of the two branched angle-modulated waves is demodulated to baseband. The demodulated signal is filtered, adjusted in level and phase and then supplied as the inversely modulating signal input of the phase modulator. The output of the phase modulator is therefore a wave which can be reused for transmission of other sideband components. The demodulated and filtered wave is provided as another output of the system.

3 Claims, 1 Drawing Figure

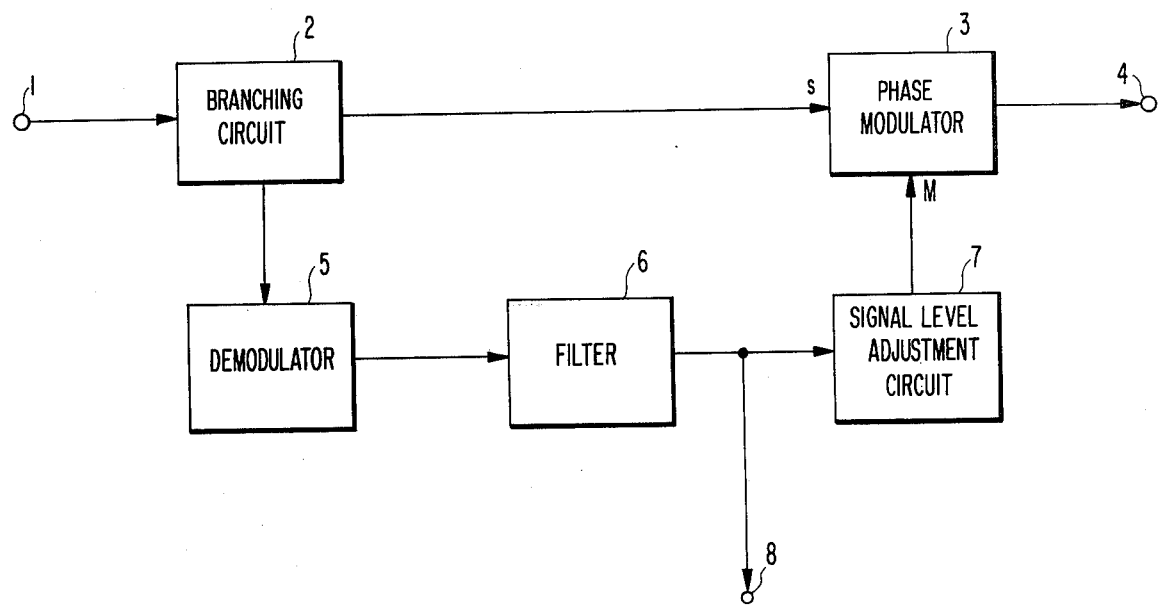

SYSTEM FOR SUPPRESSING SIDEBAND COMPONENTS OF ANGLE-MODULATED WAVE

BACKGROUND OF THE INVENTION

This invention relates to an angle-modulating communication system for transmitting radio frequency carrier waves which have been angle-modulated with frequency-division-multiplex signals, and more particularly to a system for suppressing those sideband components of angle-modulated multiplex signals which are to be branched out at a repeater station and removed from further relay.

It has been a general practice to use a system, in which radio carrier waves are angle-modulated with frequency division multiplex signals for radio transmission. In long-distance transmission employing the aforesaid system, there arises a demand that a part of the multiplex signals be branched out at intermediate radio repeater stations and a new signal be inserted, i.e., the so-called drop-and-insert facilities must be provided. To meet this demand, there has been proposed a detection relay system remodulation relay system. More specifically, the angle-modulated wave is demodulated to obtain frequency division multiplex baseband signals, and the signals are branched out and inserted at this stage and thereafter a carrier wave is angle-modulated for transmitting signals to the next repeater station. According to this system, frequency components having no bearing on the drop-and-insert process also tend to be demodulated and modulated, so that there will be incurred noise or distortion due to the modulator and demodulator. In addition, complex arrangements of modulating and demodulating circuits result, with a resulting increase in cost.

In contrast thereto, there has been proposed a branching system which has been termed a leak-off technique. With this technique, a part of radio signals leaks at a repeater station and is demodulated to take out desired frequency components alone. This system presents a simple device for branching signals, although there are encountered disadvantages, in that even after branching, such frequency components remain in the transmitting multiplex signals, and hence the aforesaid frequency components may be no longer used for the communication between repeater stations. This lowers the efficiency of frequency band use.

U.S. Pat. No. 3,294,914 patened on Dec. 27, 1966 in the name of Martin Muller is proposed to avoid these disadvantages. This patent teaches that after a desired signal has been branched according to the leak-off technique, the branched signal is phase-inverted to thereby frequency-modulate a local oscillating signal, so that an unwanted signal of the transmitting multiplex signals may be cancelled by this modulated signal. This attempt removes an unwanted spectrum from the transmitting signal, but frequency-modulates the local oscillating signal being delivered to the modulator, through which the transmitting signal passes, thus resulting in a complicated arrangement.

SUMMARY OF THE INVENTION

It is accordingly an object of the present invention to provide the improvements in the leak-off technique using a sideband components suppression system which directly suppresses the sideband components of transmitting signal corresponding to a frequency spectrum, by means of signals which have been branched according to the leak-off technique.

According to the present invention, the object and features of the present invention are attained in a system, in which an angle-modulated wave to be relayed to the next repeater station is introduced into a phase modulating circuit intact, and then baseband signals corresponding to the sideband signals to be suppressed are fed as a modulating signal input into its phase modulating circuit, so that the angle-modulated wave is phasemodulated to an inverted phase.

BRIEF DESCRIPTION OF THE DRAWING

The above-mentioned and other features and object of the present invention will become more apparent by reference to the following description taken in conjuntion with the accompanying drawing, in which the sole FIGURE is a schematic diagram in block form of a sideband suppresion system as used in a repeater station.

DESCRIPTION OF THE PREFERRED EMBODIMENT

Referring now to the drawing, reference numeral 1 is an input terminal for angle-modulated wave; 2, branching circuit; 3, a phase-modulating circuit; 4 an output terminal for an angle demodulated wave; 5, an angle modulated wave demodulating circuit; 6, a filter circuit; 7, a signal level adjusting circuit; and 8, an output terminal for a branched signal.

The angle-modulating signal which has been received at an antenna is converted into an intermediate frequency band, then amplified, and then introduced through the input terminal 1 to the branching circuit 2, where the signal is divided into two signals. One of the signals is fed to a signal input S for a wave to be modulated, while an output of the phase modulating circuit 3 is fed to the output terminal 4. The other of the branched signals is demodulated to all baseband signals through the angle-modulated-wave demodulating circuit 5, so that only such a signal spectrum, which is to be branched, is withdrawn through the filter circuit 6 appears at the output terminal 8. The signal at the output terminal 8 is introduced through a level adjusting circuit 7 to a signal input M of the phase modulating circuit 3.

With the signal level adjusting circuit 7 composed of at least one of a variable attenuator, amplifier and invertor circuit and the like, the level and/or polarity of the branched signal is adjusted, and then sideband signals corresponding to the branched signal are modulated to an inverted phase.

Assume that, in the circuit thus arranged, the filter circuit 6 allows the passage of all spectrums of a baseband signal appearing at the output of the demodulating circuit 5. If this signal is fed to the input M of the phase modulating circuit 3, with the level and polarity of the aforesaid signal being adjusted suitably, then the sideband signals are removed from the transmitting signal, with the result that the carrier wave alone appears at the output terminal 4. In other words, there takes place a phase modulation to an inverted phase.

Meanwhile, since the filter circuit 6 allows the passage of signals to be branched at this station, the signal appearing at the pfutput terminal 4 will be such signals from which only sideband signals corresponding to the spectrum of the branched signals has been removed. Thereafter, the signal at the output terminal 4 is converted into a radio frequency wave which is in in turn transmitted from a transmitting antenna to the next repeater station.

In this respect, the respective circuits leading to the output terminal 8 are well known circuits adapted to branch a signal for the leak-off system, while the circuits to be added for the purpose of suppressing an unwanted sideband signal according to the present invention are few in number.

As is apparent from the foregoing description of the system according to the present invention, the sideband signals corresponding to signals which have been branched according to the leak-off technique may be well suppressed according to a simple arrangement. This permits the use of this spectrum for the communication to the next repeater staion, with the accompanying improved efficiency of the frequency band use.

What is claimed is:

1. A system for suppressing a predetermined part of the sideband components of an angle-modulated wave in a frequency-division multiplex system, comprising:
    means for branching said angle-modulated wave into two angle-modulated waves,
    a phase modulator connected to said means for branching to receive one of said two angle-modulated waves as a signal input, and
    means for demodulating the other of said two angle-modulated waves to baseband and supplying the demodulated wave as the first output of the system and also supplying the demodulated wave as the inversely modulating signal input to said phase modulator, said phase modulator providing a second output of the system which is a wave that can be reused for transmission of other sideband components.

2. A system for suppressing a predetermined part of the sideband components of an angle-modulated wave as recited in claim 1 wherein said means for demodulating comprises:
    a demodulator connected to said means for branching, and
    a signal level adjustment circuit connected between said demodulator and said phase modulator.

3. A system for suppressing a predetermined part of the sideband components of an angle-modulated wave as recited in claim 2 wherein said means for demodulating further comprises a filter for passing demodulated signals connected between said demodulator and said signal level adjustment circuit, said first output of the system being taken from the output of said filter.

* * * * *